United States Patent [19]

Turvy, Jr.

[11] Patent Number: 5,248,879
[45] Date of Patent: Sep. 28, 1993

[54] CIRCUIT FOR ADJUSTING THE SENSITIVITY OF A SENSOR USING A DIGITAL COUNTER AND A LOW-PASS FILTER

[75] Inventor: Larry D. Turvy, Jr., Buford, Ga.

[73] Assignee: NCR Corporation, Dayton, Ohio

[21] Appl. No.: 963,295

[22] Filed: Oct. 19, 1992

[51] Int. Cl.[5] .............................................. G01J 1/32
[52] U.S. Cl. .................................. 250/205; 307/311
[58] Field of Search ............... 250/560, 561, 205, 548, 250/557, 559, 571, 214 R, 214 C, 214 AG, 551, 338.1, 338.4, 354.1; 372/31; 359/187; 307/311

[56] References Cited

U.S. PATENT DOCUMENTS

| | | | |
|---|---|---|---|
| 4,580,044 | 4/1986 | Hongo et al. | 250/205 |
| 4,730,114 | 3/1988 | Portmann | 250/551 |
| 4,734,914 | 3/1988 | Yoshikawa | 372/31 X |
| 4,769,532 | 9/1988 | Kawakami | 250/205 |
| 4,853,934 | 8/1989 | Sakurai | 372/31 X |
| 4,922,090 | 5/1990 | Turra et al. | 250/205 |
| 4,924,790 | 5/1990 | Kondo et al. | 250/561 X |
| 4,958,069 | 9/1990 | Okamori | 250/223 R |
| 5,021,676 | 6/1991 | Dragon et al. | 250/561 |
| 5,068,540 | 11/1991 | Tsuji | 250/561 |
| 5,105,077 | 4/1992 | Asada | 250/205 |
| 5,123,024 | 6/1992 | Dowd et al. | 372/31 X |
| 5,130,524 | 7/1992 | Egawa et al. | 250/205 |
| 5,159,184 | 10/1992 | Egawa et al. | 250/205 |
| 5,187,374 | 2/1993 | Rogers et al. | 250/561 |

Primary Examiner—Edward P. Westin
Assistant Examiner—John R. Lee
Attorney, Agent, or Firm—Elmer Wargo

[57] ABSTRACT

A circuit and method for adjusting the sensitivity of a sensor like a phototransistor which is coupled to an Infrared Emitting Diode (IRED). A controller places input data on a counter to vary the duty cycle of the counter and a low pass filter is used to obtain a DC voltage which varies linearly according to the input data placed on the counter. An amplifier uses the DC voltage to control the current passing through the IRED. The controller changes the input data until the output from the phototransistor reaches a predetermined level. A switchable load is added or switched into the circuit to obtain an additional range of DC voltages to be applied to the IRED when the phototransistor is one which does not generate a high output.

5 Claims, 4 Drawing Sheets

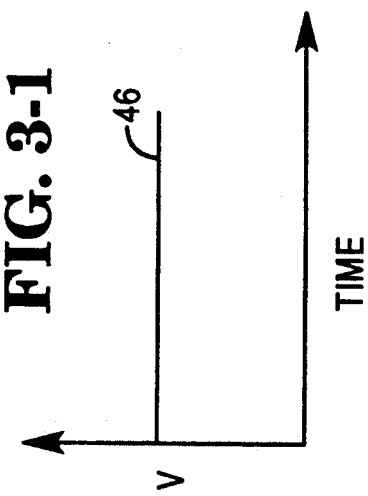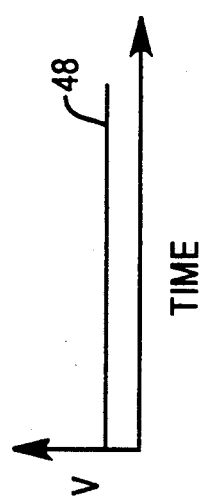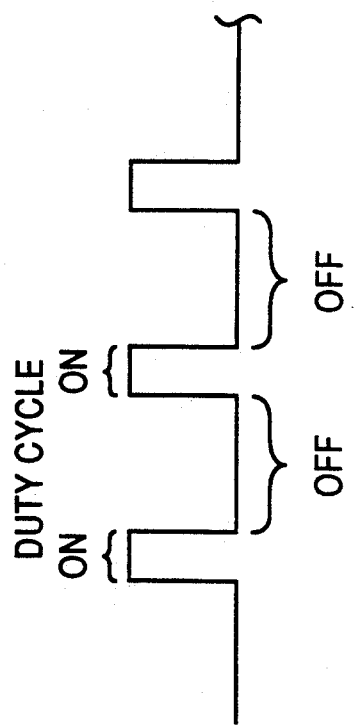

CIRCUIT FOR ADJUSTING THE SENSITIVITY OF A SENSOR USING A DIGITAL COUNTER AND A LOW-PASS FILTER

CROSS REFERENCES TO RELATED COPENDING APPLICATIONS

This application is related to U.S. application Ser. No. 672,800 now U.S. Pat. No. 5,187,374, which was filed on Mar. 21, 1991, and is entitled *OPTICAL PAPER SENSING METHOD AND APPARATUS*; this application is assigned to the same assignee as is the present application.

BACKGROUND OF THE INVENTION

1. Field of Invention. This invention relates to a method and circuit for adjusting the sensitivity of a sensor, like an optical sensor.

2. Background Information. Optical sensors may be used in printers, for example, to check upon the skewness of a document entering the printer, as indicated in the copending application mentioned above. One of the problems in such a printer is that documents of varying thicknesses are processed by the printer. Because the documents have varying thicknesses, the sensing and aligning of such documents is difficult to maintain with fixed gain optical systems in printers. The manufacturing variations such as alignment, parameter variations, dust, scratches, and degradation of optical parts in the optical systems can cause degradation errors. This problem is compounded when the optical parts or light source detector pairs, for example, are mounted on separate moveable parts of the printer.

SUMMARY OF THE INVENTION

An object of this invention is to obviate the problems mentioned above.

Another object of this invention is to provide a low cost method and circuit for providing a wide range of adjustment to and sensitivity for an element, like an optical sensor, for example.

In one aspect of this invention there is provided an adjustable sensor circuit comprising:

a first element having a current passing therethrough and generating an output in response to said current;

a reference circuit for providing a reference voltage; said reference circuit comprising:

digital means for providing a digital output having a duty cycle that varies in response to input data to said digital means; and a low-pass filter for converting said digital output into said reference voltage;

said adjustable sensor circuit also comprising:

an amplifier for receiving said reference voltage and controlling the current through said first element;

a second element in coupling relationship with said first element to receive the output from said first element to provide a responsive output thereto; and a controller for controlling the operation of said adjustable sensor circuit and for providing a plurality of said data inputs to said digital means until said responsive output equals a predetermined value.

In another aspect of this invention there is provided a method of adjusting the sensitivity of a phototransistor coupled to an Infrared Emitting Diode (IRED) through controlling the current passing through said IRED, comprising the steps of:

(a) using a controller to apply input data to a counter to generate a duty cycle in accordance therewith;

(b) using a low pass filter to generate a DC voltage level in accordance with said duty cycle;

(c) inputting the DC voltage level to an amplifier to control the current passing through the IRED, thereby generating a responsive output; and (d) repeating steps (a), (b), and (c) until said responsive output reaches a predetermined value.

BRIEF DESCRIPTION OF THE DRAWING

FIG. 3 is a schematic diagram showing a long "on" duty cycle for a counter shown in FIG. 2A.

FIG. 3-1 is a diagram showing the voltage output from a long duty cycle shown in FIG. 3.

FIG. 4 is a schematic diagram showing a short "on" duty cycle for the counter shown in FIG. 2A.

FIG. 4-1 is a diagram showing the voltage output from a short duty cycle shown in FIG. 4.

DETAILED DESCRIPTION OF THE PREFERRED EMBODIMENT

Figure 1:
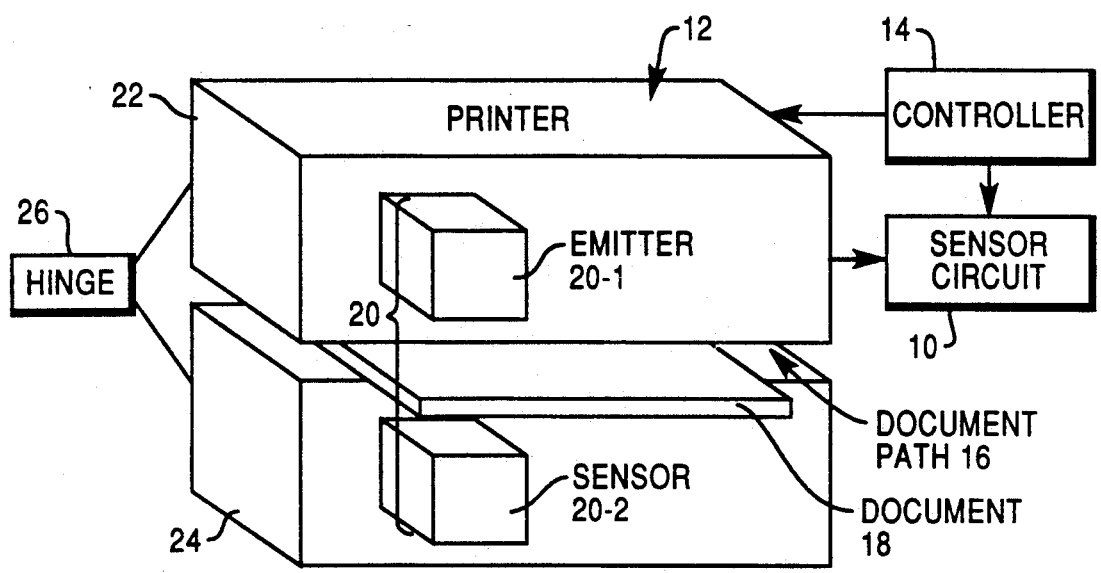
FIG. 1 is a general schematic diagram showing a sensor circuit made according to this invention and used in a printer environment.

FIG. 1 is a schematic diagram showing how a sensor circuit 10 made according to a preferred embodiment of this invention, may be used in a device, like a printer 12, for example. Both the printer 12 and the sensor circuit 10 are controlled by a controller 14. The printer 12 includes a document path 16 to receive a document 18 to enable the printer 12 to perform various functions thereon. The printer 12 may also include a plurality of sensor pairs, with one such sensor pair being shown by bracket 20. The sensor pairs, like 20, may be used to indicate the progress of the document 18 as it moves through the printer 12, for example, or they may be part of a skew detector which is used to make sure that the leading edge of the document 18 is inserted perpendicular to the document path 16.

The sensor pair 20, alluded to, includes an emitter 20-1 and a sensor 20-2. The emitter 20-1 and the sensor 2-2 are compatible with each other. For example, the sensor 20-2 is designed to receive the particular emissions of the emitter 20-1. In the embodiment described, the emitter 20-1 is an "InfraRed" Emitting Diode (IRED) and the sensor 20-2 is a phototransistor which is designed to receive the infrared output.

The sensor pair 20 and the sensor circuit 10 provide an optical sensing system which has the ability to compensate for variations in electrical conditions, optical changes, mechanical changes, and degradations in the sensor pair 20 while maintaining the system at an optimum level throughout the life of the printer 12. In some applications, the emitter 20-1 may be located in a first member 22 of the printer 12, and the sensor 20-2 may be located in a second member 24 of the printer 12, with both these members being pivotally joined by a hinge 26. When these members 22 and 24 are pivoted apart and brought together again to the position shown in FIG. 1, there may be some mechanical misalignment between the emitter 20-1 and the sensor 20-2. Over a period of time, dust settles on the sensor pair 20 causing its sensitivity to change. These few illustrations show how the sensitivity of the sensor 20 may be adversely affected.

Another problem with sensors is that they sometimes have a narrow range of adjustability; this generally means that the sensors have tolerances which are higher than one would like them to be. High tolerances generally mean expensive components.

Figure 2A:
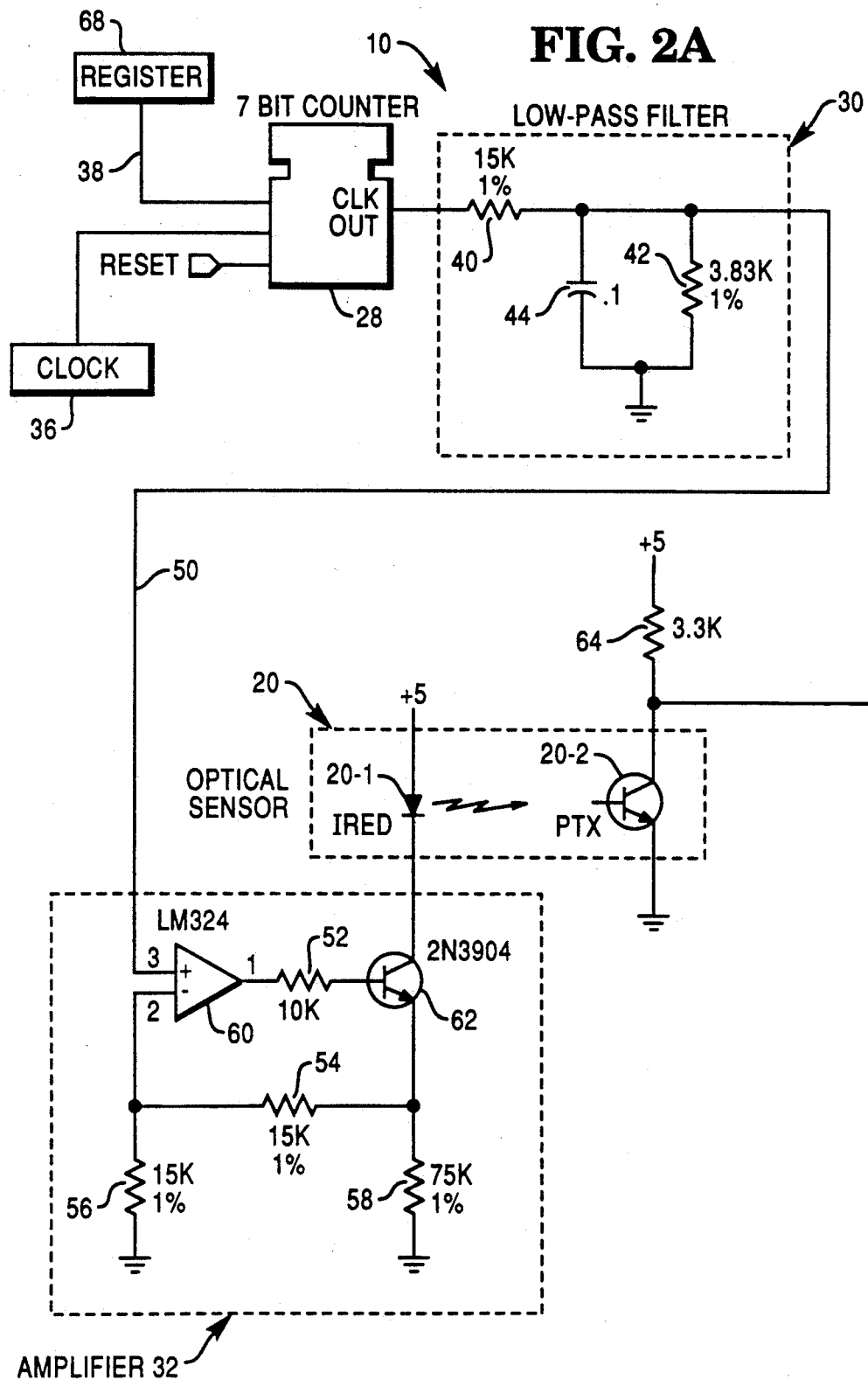
FIGS. 2A and 2B taken together provide a schematic diagram showing the sensor circuit shown in FIG. 1.
Figure 2B:
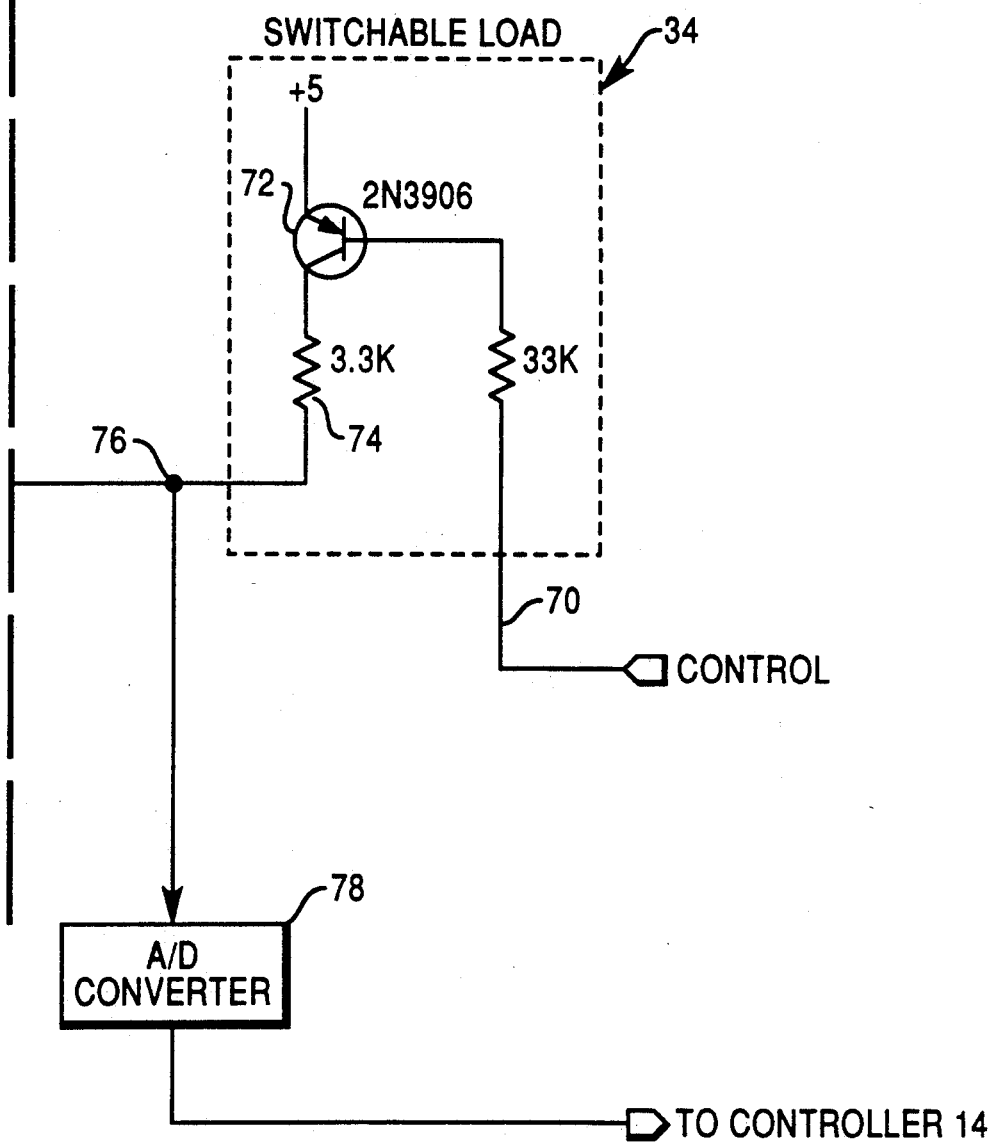

The sensor circuit 10, shown in more detail in FIGS. 2A and 2B, essentially controls the flow of current through the emitter 20-1, which in the embodiment described, is an IRED. In the copending application mentioned earlier herein, the flow of current through the emitter 20-1 was controlled by a resistor network. Different amounts of resistors were added into or taken out of the circuit to control the current through the emitter 20-1. One of the problems with the type of arrangement including the resistor network is that it was difficult to obtain or maintain as high a tolerance level as was desired. This was true even when using resistors having high tolerances. With various combinations of resistors being switched into the circuit in a "stacked relationship," there was not a direct linear relationship between the resistors which were clicked into the circuit and the current passing through the emitter, like emitter 20-1 in FIG. 2A. This is probably due to a "tolerance buildup" among a large number of resistors used in the circuit. A linear design will significantly increase the sensitivity of adjustment of all the sensors within the bounds of the sensor's specification. A non-linear design will adjust some sensors, like 20-2, better than others depending upon the non-linearity of each change in the current through the emitter 20-1.

In contrast, in the present invention, there is a direct linear correlation between the input control exerted by the sensor circuit 10 and the current passing through the emitter 20-1. The sensor circuit 10 includes a counter 28, a low pass filter 30 (shown in the dashed rectangle), an amplifier 32 (shown in the dashed rectangle), and a switchable load 34 (shown in the dashed rectangle). The function of the sensor circuit 10 is to control the current through emitter 20-1 of the sensor pair 20 with precision. The counter 28, the low pass filter 30, and the amplifier 32 comprise the basic sensor circuit 10, and the switchable load 34 is used to increase the range of adjustments which is possible with the sensor circuit 10.

When the output of the emitter 20-1 falls upon the sensor 20-2 (FIG. 2A), a current is generated therein. With the same output from the emitter 20-1, different sensors 20-2, generally, will generate different currents. In other words, some sensors 20-2 will generate a higher current than anticipated, and some will generate a lower current than anticipated.

The sensor circuit 10 (FIGS. 2A and 2B) provides a linear design which significantly increases the sensitivity of the adjustment of a sensor, like 20-2. In the embodiment described, the sensor circuit 10 uses an eight megahertz clock as its input and its output is of a fixed frequency equal to 62.0 (kHz) with a variable duty cycle. The duty cycle depends upon a value which is placed on the data input lines 38 by software associated with the controller 14. The duty cycle is equal to (n+1)/1.29 (percentage) where "n" is a seven bit value from 0 to 127. A key feature of the counter 28 is that the duty cycle of the output varies linearly with the value placed on the data input lines 38.

The output from the counter 28 (FIG. 2A) is fed into the low pass filter 30. The filter 30 is conventional, and it includes resistors 40 and 42 and capacitor 44 which are coupled as shown. When the "on" duty cycle from the counter 28 is long, as shown in FIG. 3, the voltage from the low-pass filter 30 is high as shown by line 46 in FIG. 3-1. When the "on" duty cycle from the counter 28 is short, as shown in FIG. 4, the voltage from the low-pass filter 30 is low as shown by line 48 in FIG. 4-1. The input-to-output equation for the filter 30 is exactly linear.

The output voltage from the low-pass filter 30 (line 50) is fed into the amplifier 32 which uses the output voltage as a reference voltage to set the current through the emitter 20-1. The amplifier 32 accomplishes this by converting the current in the emitter 20-1 to a voltage, and then, it compares this voltage to a reference voltage coming in on line 50. In other words, the amplifier 32 controls the current passing through the emitter 20-1 regardless of what is happening (within reason) in the unit or emitter 20-1 itself.

An advantage of the sensor circuit 10 is that there is a direct correlation between the numerical count or data value which is placed on the data lines 38 by the software associated with the controller 14 and the emitter 20-1 which is to be controlled. With the other circuit mentioned in the Background, there is not a direct linear relationship between the resistors of the resistor network clicked into operation and the current passing through the emitter 20-1. The values of the resistors 52, 54, 56, and 58 included in the amplifier 32 are shown in FIG. 2A and are included in this figure. The amplifier 60 and the transistor 62 are also identified in FIG. 2A.

Another feature of this invention is that sensor circuit 10 has the switchable load 34 to increase the range of sensitivity of the circuit 10. The sensor circuit 10 has a fixed load resistor 64 for the sensor 20-2 which is a phototransistor. The switchable load is controlled by software associated with the controller 14. When the switchable load 34 is switched in by the controller 14, the load presented to the sensor 20-2 is doubled. This permits a smaller load to be used with a weak sensor 20-2 and a heavier load to be used with a strong sensor 20-2. A strong sensor 20-2 is one which generates a high current for the output coming from the emitter 20-1 whereas a weak sensor 20-2 generates a lower current for the same output from the emitter 20-1.

With regard to the current passing through the emitter 20-1, it should be recalled that the output coming from the low-pass filter 30 is dependent upon the duty cycle of the counter 28. Also, the duty cycle of the counter 28 is linearly dependent upon the data value placed on a register 68. An equation which describes the IRED current passing through the emitter 20-1 in terms of a seven bit value placed on the register 68 in the embodiment described is as follows:

$$1_{IRED} = 0.2060 * (D+1)(mA),$$

in which D is the seven bit value on the register 68, and the IRED current is stated in milliamps. Equation 1 is only for typical values. Note that the tolerances of the resistors used in the sensor circuit 10 affect only the constant multiplier (0.2060), thereby preserving the linearity of the circuit 10.

Another feature of this invention is that the values output from the counter 28 are more meaningful than the resistor network circuit mentioned with regard to the current passing through the emitter 20-1. Using the simple Equation 1 mentioned, one can quickly determine how much IRED current is flowing. With the resistor network mentioned, the IRED current was determined as follows:

1. A table value had to be looked up;

2. The resistors which were turned on had to be determined;

3. The equivalent resistance of the resistors had to be calculated; and

4. An approximate value of the IRED current had to be calculated.

Another feature of this invention is that it has the switchable load 34 which can be selectively activated to increase the sensitivity of the sensor circuit 10. The switchable load 34 is controlled by software associated with the controller 14. In the embodiment described, when the switchable load is switched on, the load presented to the sensor 20-2 is doubled. This enables a smaller load to be used with weak sensors which are used in the position of sensor 20-2 and a heavier load to be used with strong sensors. The switchable load presented to the sensor 20-2 permits a wider range of specifications to be written for the sensor 20-2, making its cost cheaper.

The switchable load 34 (FIG. 2B) is switched in via a control line 70 coming from the controller 14. When the control line 70 becomes active, it conditions a transistor 72 to couple a resistor 74 in parallel with the resistor 64, thereby doubling the load presented to the sensor 20-1. The output (from node 76) from the sensor circuit 10 is coupled through a conventional A/D converter 78 to the controller 14.

The procedure for deciding whether or not the switchable load is to be added to the sensor circuit 10 is as indicated by the following steps:

1. Assume that the sensor 20-2 provides a strong output.

2. Turn the switchable load 34 on; this results in a lower voltage at node 76.

3. Start out with the lowest current passing through the emitter 20-1. The lowest current is determined by the lowest count which is placed on the data lines 38 by the controller 14.

4. Increase the count on the data lines 38 (via the controller 14) until the Voltage at the node 76 rises to the expected adjustment point voltage, which in the embodiment described, is two volts.

5. Discontinue the adjustment procedure when the desired adjustment point voltage is obtained because the controller 14 notes that the desired sensitivity of the sensor 20-2 has been obtained.

If the expected adjustment point voltage is not obtained at step 4 mentioned above, it probably means that the sensor 20-2 is of the type which generates a low current instead of a strong current as discussed earlier herein. The controller 14, through its software, determines that the particular sensor 20-2 in the sensor circuit 10 is of the type which generates a weak current. In response to this situation, the controller 14 removes the switchable load 34 from the sensor circuit 10 and performs the following steps:

Start out with the lowest current passing through the emitter 20-1. The lowest current is determined by the lowest count which is placed on the data lines 38 by the controller 14.

2. Increase the count on the data lines 38 (via the controller 14) until the voltage at the node 76 rises to the expected adjustment point voltage, which in the embodiment described, is two volts.

3. Discontinue the adjustment procedure when the desired adjustment point voltage is obtained because the controller 14 notes that the desired sensitivity of the sensor 20-2 has been obtained.

To summarize some of the features of the present invention, there are the following points:

1. The combination of a switchable load and a large number of adjustments (128 combinations for each of two load combinations, making a total of 256 combinations) allows or permits sensors to be specified with wider specifications. The typical price reduction is about 50% when compared with the sensors used in the resistor network combination mentioned earlier herein. The wider range for the sensors provided with this invention may eliminate the need for several sensors used in similar applications.

2. The design of sensor circuit 10, with its many adjustments, provides nearly six times the sensitivity of the resistor network circuit mentioned earlier herein.

3. Because of the linear nature of the sensor circuit 10, all the data values which can be written to the seven bit counter 28 are valid. There is no problem with tolerance buildup of the components.

4. The design of sensor circuit 10 provides a large increase in the sensitivity adjustment which can be achieved. All the sensors 20-2 used in a circuit can be adjusted to have a similar sensitivity.

5. Because the specification range for the sensors 20-2 is wider than those used in the resistor network mentioned earlier herein, the vendor's yield on the sensors 20-2 increases, thereby reducing costs and increasing the probability of meeting supply schedules and quantities.

What is claimed is:

1. An adjustable sensor circuit comprising:
    a first element having a current passing therethrough and generating an output in response to said current;
    a reference circuit for providing a reference voltage; said reference circuit comprising:
    digital means for providing a digital output having a duty cycle that varies in response to input data to said digital means; and
    a low-pass filter for converting said digital output into said reference voltage;
    said adjustable sensor circuit also comprising:
    an amplifier for receiving said reference voltage and controlling the current through said first element;
    a second element in coupling relationship with said first element to receive the output from said first element to provide a responsive output thereto; and
    a controller for controlling the operation of said adjustable sensor circuit and for providing a plurality of said data inputs to said digital means until said responsive output equals a predetermined value.

2. The adjustable sensor circuit as claimed in 1 further including:
    a switchable load having a first state in which said switchable load is switched into said circuit, and also having a second state in which said switchable load is switched out of said circuit in response to said controller;
    said switchable load when in said first state being effective to alter the sensitivity of said second element.

3. The adjustable sensor circuit as claimed in claim 2 in which said digital means includes a digital counter providing said digital output and said controller includes a program for providing said plurality of data inputs to said digital means.

4. The adjustable sensor circuit as claimed in claim 3 in which said first element is an infrared emitting diode and said second element is a phototransistor.

5. A method of adjusting the sensitivity of a phototransistor coupled to an Infrared Emitting Diode (IRED) through controlling the current passing through said IRED, comprising the steps of:

(a) using a controller to apply input data to a counter to generate a duty cycle in accordance therewith;
(b) using a low pass filter to generate a DC voltage level in accordance with said duty cycle;
(c) inputting the DC voltage level to an amplifier to control the current passing through the IRED, thereby generating a responsive output; and
(d) repeating steps (a), (b), and (c) until said responsive output reaches a predetermined value.

* * * * *